United States Patent
Li et al.

(10) Patent No.: US 10,120,192 B2
(45) Date of Patent: Nov. 6, 2018

(54) SHORT-RANGE OPTICAL AMPLIFICATION MODULE, SPECTACLES, HELMET AND VR SYSTEM

(71) Applicant: SHENZHEN DLODLO NEW TECHNOLOGY CO., LTD., Shenzhen, Guangdong (CN)

(72) Inventors: Gang Li, Guangdong (CN); Weiping Tang, Guangdong (CN)

(73) Assignee: SHENZHEN DLODLO NEW TECHNOLOGY CO., LTD, Shenzhen (CN)

( * ) Notice: Subject to any disclaimer, the term of this patent is extended or adjusted under 35 U.S.C. 154(b) by 106 days.

(21) Appl. No.: 15/129,778

(22) PCT Filed: Mar. 21, 2016

(86) PCT No.: PCT/CN2016/076936
§ 371 (c)(1),
(2) Date: Sep. 27, 2016

(87) PCT Pub. No.: WO2017/161487
PCT Pub. Date: Sep. 28, 2017

(65) Prior Publication Data
US 2018/0088332 A1  Mar. 29, 2018

(51) Int. Cl.
*G02B 27/28* (2006.01)
*G02B 27/01* (2006.01)
(Continued)

(52) U.S. Cl.
CPC ........... *G02B 27/0172* (2013.01); *G02B 5/30* (2013.01); *G02B 27/0012* (2013.01);
(Continued)

(58) Field of Classification Search
CPC ........ G02B 5/30; G02B 5/3085; G02B 17/00; G02B 17/06; G02B 25/00; G02B 25/002;
(Continued)

(56) References Cited

U.S. PATENT DOCUMENTS 3,480,875 A * 11/1969 Pole .................. H01S 3/101
                                                    359/302
6,075,651 A   6/2000 Hoppe
(Continued)

FOREIGN PATENT DOCUMENTS

CN       1930511 A     3/2007
CN     104414747 A     3/2015
(Continued)

OTHER PUBLICATIONS

International Search Report and Written Opinion for Application No. PCT/CN2016/076936, 8 pages.
(Continued)

*Primary Examiner* — Loha Ben
(74) *Attorney, Agent, or Firm* — Reising Ethington, P.C.

(57) ABSTRACT

A short-range optical amplification module, spectacles, a helmet and a VR system. The amplification module includes a reflective polarizing plate, a first phase delay plate, a second lens and a second phase delay plate, and a first lens. In the second lens, the optical surface adjacent to the second phase delay plate is a transflective optical surface. The first focal length f2 of the second lens meets the condition: 1F≤f2≤2F, wherein F is the system focal length of the optical amplification module. By performing parameter refining on the first focal length f2 that influences the optical amplification effect, the module can keep a small overall thickness while obtaining a large optical amplification effect, and the VR device can realize a good field angle, a large oculomotor range and a high-quality imaging effect.

14 Claims, 16 Drawing Sheets

(51) Int. Cl.

| | |
|---|---|
| *G02B 5/30* | (2006.01) |
| *G02B 27/00* | (2006.01) |
| *G06T 3/00* | (2006.01) |
| *G06T 3/40* | (2006.01) |
| *G06T 19/00* | (2011.01) |
| *G02F 1/01* | (2006.01) |

(52) U.S. Cl.
CPC ........... *G02B 27/01* (2013.01); *G02B 27/28* (2013.01); *G02F 1/01* (2013.01); *G06T 3/0018* (2013.01); *G06T 3/4053* (2013.01); *G06T 19/006* (2013.01); *G02B 5/3083* (2013.01); *G02B 27/0025* (2013.01); *G02B 27/286* (2013.01); *G02B 2027/0123* (2013.01)

(58) Field of Classification Search
CPC .... G02B 25/005; G02B 25/007; G02B 27/01; G02B 27/0101; G02B 27/017; G02B 27/0172; G02B 27/02; G02B 27/0977; G02B 27/10; G02B 27/26; G02B 27/281; G02B 27/286; G02B 2027/0116; G02B 2027/0118; G02B 2027/0123; G02B 27/0012; G02B 27/0025; G02F 1/01; G03B 21/2066; G03B 21/2073; G03B 21/208; G03B 21/14; G06T 3/0018; G06T 3/4053; G06T 19/006
USPC ......... 359/279, 484.01, 484.08, 485.01, 646, 359/717, 726, 798; 353/20; 349/96, 113
See application file for complete search history.

(56) References Cited

U.S. PATENT DOCUMENTS

| | | | | |
|---|---|---|---|---|
| 6,108,131 | A * | 8/2000 | Hansen | F21V 9/14 359/485.05 |
| 6,208,463 | B1 * | 3/2001 | Hansen | G02B 5/3058 349/9 |
| 6,273,569 | B1 * | 8/2001 | Iechika | G02B 27/283 353/20 |
| 6,452,724 | B1 * | 9/2002 | Hansen | F21V 9/14 359/485.05 |
| 6,520,643 | B1 * | 2/2003 | Holman | G03B 21/2073 349/9 |
| 6,767,594 | B1 * | 7/2004 | Miroshin | G02B 3/005 349/106 |
| 6,853,491 | B1 | 2/2005 | Ruhle | |
| 8,403,488 | B2 * | 3/2013 | Schuck | G02B 17/045 349/8 |
| 8,425,041 | B2 * | 4/2013 | Schuck | G03B 35/26 349/5 |
| 9,690,097 | B2 * | 6/2017 | Tang | G02B 27/0101 |
| 9,759,915 | B2 * | 9/2017 | Tang | G02B 27/0101 |
| 2005/0286135 | A1 | 12/2005 | Weissman | |
| 2015/0070773 | A1 | 3/2015 | Wang et al. | |

FOREIGN PATENT DOCUMENTS

| | | |
|---|---|---|
| CN | 105093555 A | 11/2015 |
| CN | 204855955 U | 12/2015 |
| CN | 105676477 A | 6/2016 |
| CN | 205562978 U | 9/2016 |
| JP | 08-110492 A | 4/1996 |
| JP | 10-10465 A | 1/1998 |
| JP | 10-186245 A | 7/1998 |
| JP | 2000-275566 A | 10/2000 |
| JP | 2001356295 A | 12/2001 |
| JP | 2007512581 A | 5/2007 |
| JP | 2013109050 A | 6/2013 |

OTHER PUBLICATIONS

European Search Report for Application No. 16774841.7-1562 PCT/CN2016076936 dated Sep. 18, 2017, 7 pages.

* cited by examiner

SHORT-RANGE OPTICAL AMPLIFICATION MODULE, SPECTACLES, HELMET AND VR SYSTEM

FIELD

The present invention relates to an optical apparatus, and in particular, to a short-range optical amplification module, spectacles, a helmet and a Virtual Reality (VR) system.

BACKGROUND

In the structure of an existing optical amplification module, as shown in FIG. 1, it includes a reflective polarizing plate 01, a first phase delay plate 02, a lens unit 03 and a second phase delay plate 04 that are arranged sequentially. In the lens unit 03, the optical surface adjacent to the second phase delay plate 04 is a transflective optical surface. In use, an optical image is transmissively amplified by the lens unit 03, then reflected by the reflective polarizing plate 01, and again amplified by the lens unit 03, and finally enters the human eye via the reflective polarizing plate 01. Moreover, other lens units that do not influence the phase delay of light are further set on either side of any one of the reflective polarizing plate 01, the first phase delay plate 02, the second lens 03 and the second phase delay plate 04. The lens unit 03 and other lens units constitute a lens assembly, which is the core part that influences the amplification effect on the optical image.

In order to provide a good user experience, an intelligent Virtual Reality (VR) wearable device needs to provide a wide field angle, a large eyebox, high-quality imaging effect and a compact ultrathin structure, etc. In order to achieve the above objects, the lens assembly in the structure of the optical amplification module needs to be optimized. However, the structure of the existing optical amplification module does not have an optimized design, thus it cannot be guaranteed that the above objects can be achieved in the whole range, that is, it cannot guarantee a good user experience.

SUMMARY

The embodiments disclosed herein provide a short-range optical amplification module, spectacles, a helmet and a VR system, thereby solving the problem of the prior art.

On the first aspect, there is provided a short-range optical amplification module, which includes a reflective polarizing plate, a first phase delay plate, a second lens and a second phase delay plate that are arranged sequentially, wherein:

A first lens is further set on either side of any one of the reflective polarizing plate, the first phase delay plate, the second lens and the second phase delay plate;

In the second lens, the optical surface adjacent to the second phase delay plate is a transflective optical surface;

The first focal length f2 of the second lens meets the following condition: $1F \leq f2 \leq 2F$, wherein, F is the system focal length of the short-range optical amplification module.

In conjunction with the first aspect, in a first possible implementation mode of the first aspect, the effective focal length fs4 of the reflection surface of the transflective optical surface meets the following condition: $1.5F \leq fs4 \leq 5F$.

In conjunction with a second possible implementation mode of the first aspect, in the second possible implementation mode of the first aspect, the effective focal length fs4 of the reflection surface of the transflective optical surface meets the following condition: $1F \leq fs4 \leq 2F$.

In conjunction with the first aspect, in a third possible implementation mode of the first aspect, the first focal length f2 of the second lens meets the following condition: $1.5F \leq f2 \leq 2F$.

In conjunction with the third possible implementation mode of the first aspect, in a fourth possible implementation mode of the first aspect, the first focal length f2 of the second lens is 1.6F.

In conjunction with the first aspect or in the first possible implementation mode of the first aspect to the fourth possible implementation mode of the first aspect, in the second lens, the focal length fs3 of the optical surface adjacent to the first lens meets the following condition: $|fs3| \geq 2F$.

In conjunction with the first aspect or in the first possible implementation mode of the first aspect to the fourth possible implementation mode of the first aspect, the focal length f1 of the first lens meets the following condition: $|f1| \geq 3F$.

In conjunction with the first aspect or in the first possible implementation mode of the first aspect to the fourth possible implementation mode of the first aspect, the thickness of the short-range optical amplification module is 11~28 mm.

In conjunction with the first aspect or in the first possible implementation mode of the first aspect to the fourth possible implementation mode of the first aspect, the eye relief of the short-range optical amplification module is 5~10 mm.

In conjunction with the first aspect or in the first possible implementation mode of the first aspect to the fourth possible implementation mode of the first aspect, the aperture D, through which the light L that takes part in imaging via the second lens and the first lens passes, meets the following condition: $0.28F \leq D \leq 0.45F$.

In the second aspect, there is provided short-range optical amplification spectacles, which include the short-range optical amplification module of the first aspect, and the short-range optical amplification spectacles further include a display screen, which is set coaxially or noncoaxially with the short-range optical amplification module.

In the third aspect, there is provided a short-range optical amplification helmet, which includes the short-range optical amplification module of the first aspect, and the short-range optical amplification helmet further includes a display screen which is set coaxially or noncoaxially with the short-range optical amplification module.

In the fourth aspect, there is provided a short-range optical amplification VR system, which includes the spectacles of the second aspect or the helmet of the third aspect.

In the embodiments disclosed, parameter refining on the first focal length f2 that influences the optical amplification effect enables the module to keep a small overall thickness while obtaining a large optical amplification effect, so that the VR device can achieve a wide field angle, a large eyebox, high-quality imaging effect, and hence a better user experience.

BRIEF DESCRIPTION OF THE DRAWINGS

These and other objects and features will become clear from the following description taken in conjunction with the preferred embodiments with reference to the accompanying drawings, in which.

DETAILED DESCRIPTION OF THE EMBODIMENTS

In order to make one skilled in the art better understand the solutions of the present invention, the embodiments will be described clearly and fully below with reference to the accompanying drawings. It is obvious that from the teaching of this invention the skilled person may find other embodiments to realize the teaching of the present invention without applying additional inventive activity. These embodiments are still under the scope of the present invention.

Figure 1:
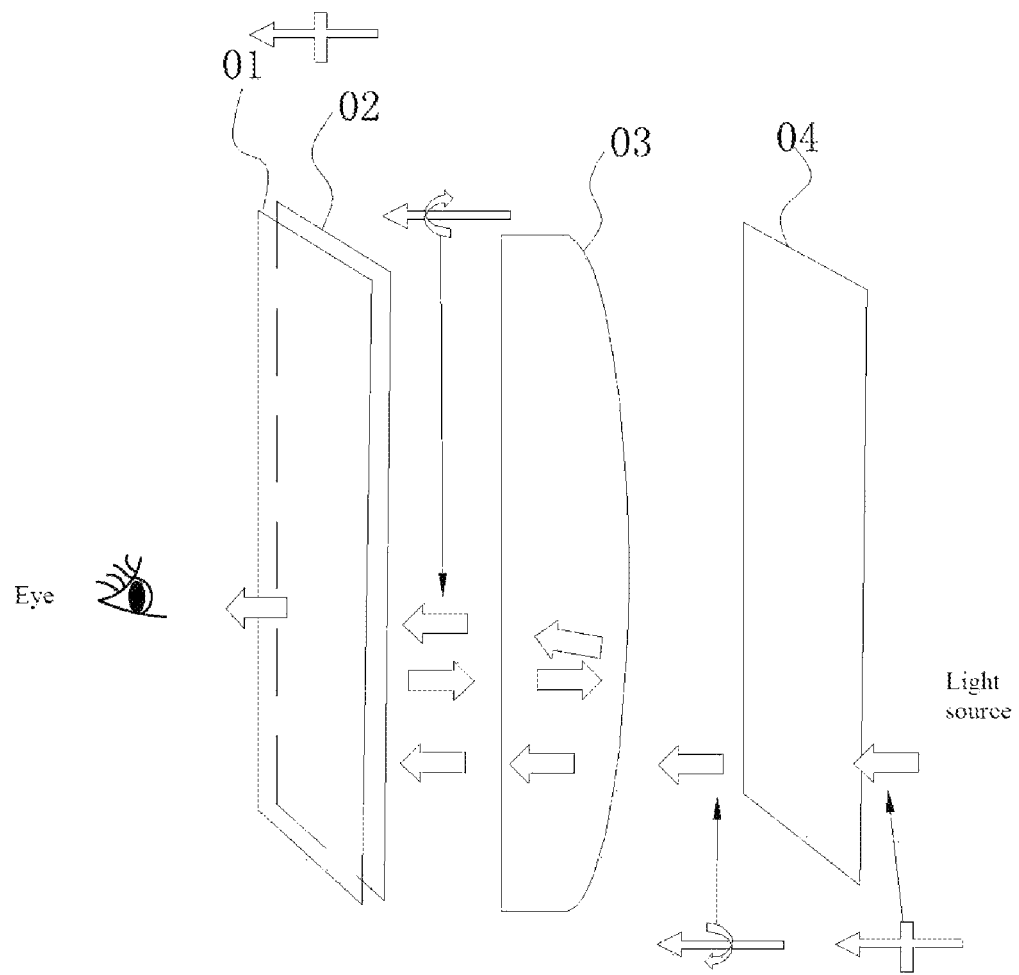
FIG. 1 is a diagram schematically showing the overall construction of a short-range optical amplification module of the prior art.

Referring to FIGS. 2, 6, 10, 14 and 18, they are structural diagrams of the short-range optical amplification modules according to the embodiments. The short-range optical amplification module includes a reflective polarizing plate, a first phase delay plate, a second lens 20 and a second phase delay plate that are arranged sequentially, wherein, a first lens 10 is further set on either side of any one of the reflective polarizing plate, the first phase delay plate, the second lens 20 and the second phase delay plate. Because the reflective polarizing plate, the first phase delay plate and the second phase delay plate are not shown in FIGS. 2, 6, 10, 14 and 18, reference may be made to FIG. 1 for examples of these features. It should be noted that, in the drawings of these embodiments, the first lens 10 is set on the left of the second lens 20; however, in practical application, the first lens 10 may also be set on the right of the second lens 20, which will not be described again.

The first lens 10 and the second lens 20 are the core parts that influence the optical amplification effect of the short-range optical amplification module whose system focal length F is 15~35 mm, however, the system focal length F is not limited to this numerical range, for example, it may also be 8~30 mm; furthermore, the first lens 10 and the second lens 20 may be attached to each other, or a certain space may exist therebetween.

As defined in these embodiments: the optical surface on the left side of the first lens 10 is a first optical surface E1, and the optical surface on the right side of the first lens is a second optical surface E2; the optical surface on the left side of the second lens 20 is a third optical surface E3, and the optical surface on the right side of the second lens 20 is a fourth optical surface E4.

After passing successively through the second phase delay plate, the second lens 20, the first lens 10 and the first phase delay plate, an optical image from the object side arrives at the reflective polarizing plate, where it is reflected for the first time, then after passing through the first phase delay plate, it arrives at the fourth optical surface E4, where it is reflected for the second time, and then it reaches the human eye after passing through the first phase delay plate and the reflective polarizing plate. Thus, the optical image may be reflected and amplified twice in the short-range optical amplification module, thereby meeting the requirement of optical amplification.

Furthermore, in these embodiments, a first lens 10 and a second lens 20 are provided, wherein the two lenses work together to contribute to the system focal length, balance the aberration for each other and improve the imaging quality.

In order to realize a wide field angle, a large eyebox, high-quality imaging effect and a compact ultrathin structure when the short-range optical amplification module is applied to an intelligent VR wearable device, the first focal length f2 of the second lens 20 should meet the following condition:

$$F \leq f2 \leq 2F \quad (1)$$

Wherein, the focal length measured after the incident light penetrates through the third optical surface E3 and is reflected by the fourth optical surface E4 is defined as the first focal length f2.

The first focal length f2 of the second lens 20 is the main source of the system optical power. If the reflection surface-containing optical power is too high, for example, approaching the overall optical power of the system (f2<F), it will be too difficult to correct the aberration. If the reflection surface-containing optical power is too low (f2>2F), the optical power burdened on other lenses will be too high, and lenses need to be added to correct the aberration, which is adverse to the compact and lightweight design of the optical system.

Condition (1) defines the specific range of the first focal length f2 of the second lens 20. A screen with a size of 1.3~2.6 inch is used in the optical system, thus a wide field angle may be obtained, and it may allow a high screen resolution, wherein the field angle V that may be obtained is 90°~100°, and the screen resolution that may be allowed is 800*800~4000*4000.

In the second lens 20, the effective focal length fs4 of the reflection surface of the fourth optical surface E4 meets the following condition:

$$1.5F \leq fs4 \leq 5F \qquad (2)$$

In these embodiments, the focal length measured after the incident light is reflected by the fourth optical surface E4 is defined as the effective focal length fs4 of the reflection surface.

The reflection surface of the fourth optical surface E4 is the main source of the system optical power. If its optical power is too high, for example, approaching the overall optical power of the system (fs4<F), it will be too difficult to correct the aberration. Furthermore, the optical surface may appear too curved and the lens too thick, thereby causing the increase of the thickness of the system, which is adverse to the lightweight and ultrathin design of a VR wearable device requires. On the contrary, if its optical power is too low (fs4>5F), the optical power burdened on other lenses will be too high, and additional lenses need to be added to correct the aberration, which is adverse to the compact and lightweight design of the optical system.

In the second lens 20, the focal length fs3 of the third optical surface E3 meets the following condition:

$$|fs3| \geq 2F \qquad (3)$$

If the focal length fs3 is too short, it means that the second lens 20 may be too curved, which is adverse to the correction of aberration. Furthermore, if the second lens 20 is too curved, it may increase the thickness of the optical system, which is adverse to the lightweight and thin design that a VR wearable device requires.

The focal length f1 of the first lens 10 meets the following condition:

$$|f1| \geq 3F \qquad (4)$$

If the focal length f1 is too short (|f1|<3F), it means that the first lens 10 will be too curved, and stronger aberration may be introduced into the whole optical system. Furthermore, the thickness of the first lens 10 will also be increased, which is adverse to the light and thin design that a VR wearable device requires.

In order to achieve a small and ultrathin VR wearable device, the thickness of the short-range optical amplification module is designed as 11~28 mm, wherein the thickness is the maximum distance between the two sides of the short-range optical amplification module along its optical axis direction.

In consideration of both the comfortability and imaging quality of the VR device, the eye relief of the short-range optical amplification module is designed as 5~10 mm, wherein the eye relief is the distance between the eyeball and the eyepiece (the optical surface nearest to human eye) at which an observer can see clearly the image within the field of view.

In order to obtain both a large eyebox and good imaging quality, the adjustable range of the aperture is designed as 2.2F~3.5F. That is, the aperture D, through which the light that takes part in imaging via the second lens and the first lens passes, meets the following condition:

$$0.28F \leq D \leq 0.45F \qquad (5)$$

Corresponding to condition (5), the eyebox A obtained is 5~10 mm.

Moreover, the numerical range of the conditions (1) and (2) may be better set as follows:

$$1.5F \leq f2 \leq 2F \qquad (1a)$$

$$1F \leq fs4 \leq 2F \qquad (2a)$$

The short-range optical amplification module according to these embodiments will be further described below in conjunction with the tables attached.

In the specific design parameter table of the short-range optical amplification module of each embodiment, OBJ represents an object in the optical system, IMA represents an image in the optical system, STO represents an diaphragm in the optical system, Thickness represents the distance between optical surface i and optical surface i+1, wherein i represents the sequence ($i_o$)+1 of optical surfaces starting from the object side. The light goes from the first lens 10 on the left side to the second lens 20 on the right side, and when it meets a material (Glass) listed as MIRROR, it will be reflected towards the reverse direction, and when it meets a second MIRROR, it will be reflected again from left to right, and finally it will reach the image surface.

Embodiment 1

Figure 2:
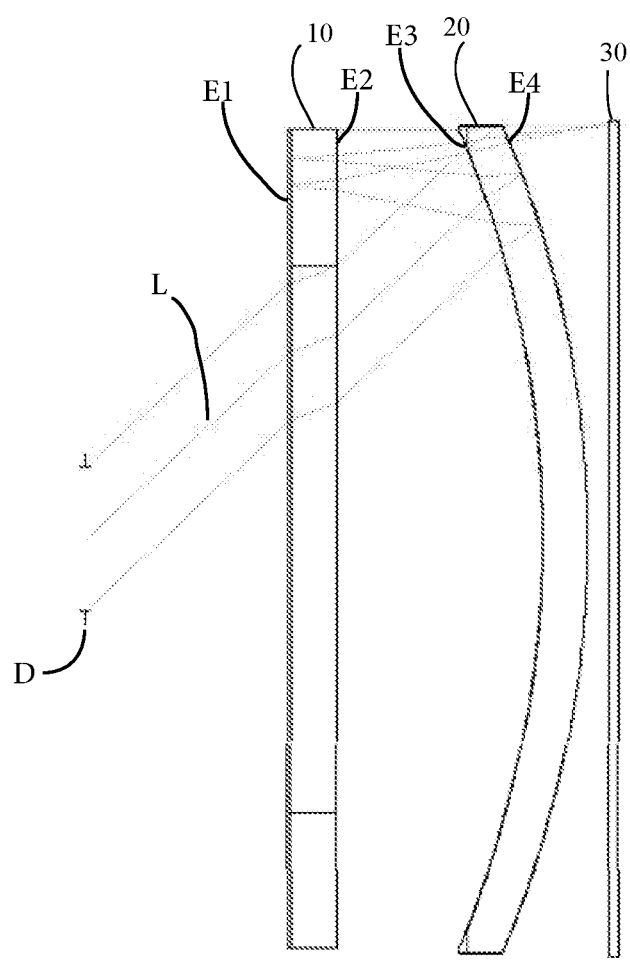
FIG. 2 is a diagram schematically showing the overall construction of a short-range optical amplification module according to Embodiment 1.

As shown in FIG. 2, in the short-range optical amplification module, the first focal length f2 of the second lens 20 is designed as equal to the system focal length F, wherein:

The specific design parameters of the short-range optical amplification module are as shown in Table 1:

| Surf | Type | Radius | Thickness | Glass | Diameter | Conic |
|---|---|---|---|---|---|---|
| OBJ | STANDARD | Infinity | −200 | | 400 | 0 |
| STO | STANDARD | Infinity | 9 | | 7 | 0 |
| 2 | STANDARD | Infinity | 0.2 | PMMA | 24.685 | 0 |
| 3 | STANDARD | Infinity | 2 | H-ZF52A | 24.89819 | 0 |
| 4 | STANDARD | 888 | 9.210156 | | 26.6281 | −33 |
| 5 | STANDARD | −55 | 2 | H-QK1 | 38.26443 | 0 |
| 6 | STANDARD | −56 | −2 | MIRROR | 40.54977 | 0.915605 |
| 7 | STANDARD | −55 | −9.210156 | | 40.02718 | 0 |
| 8 | STANDARD | 888 | −2 | H-ZF53A | 39.72057 | −33 |
| 9 | STANDARD | Infinity | −0.2 | PMMA | 39.69469 | 0 |
| 10 | STANDARD | Infinity | 0 | MIRROR | 39.69181 | 0 |
| 11 | STANDARD | Infinity | 0.2 | PMMA | 39.69181 | 0 |
| 12 | STANDARD | Infinity | 2 | H-ZF52A | 39.68893 | 0 |
| 13 | STANDARD | 888 | 9.210156 | | 39.66306 | −33 |
| 14 | STANDARD | −55 | 2 | H-QK1 | 39.77483 | 0 |
| 15 | STANDARD | −56 | 1 | | 40.25757 | 0.915605 |
| 16 | STANDARD | Infinity | 0.4 | BK7 | 41.00791 | 0 |
| IMA | STANDARD | Infinity | | | 41.12973 | 0 |

In Table 1, the first row OBJ represents the design parameters related with the object plane; the second row STO represents a diaphragm in the optical system, the aperture of which is 7 mm; the third row represents a membrane consisting of a reflective polarizing plate and a first phase delay plate in the optical module, of which the type is STANDARD (standard plane), the material is PMMA, the diameter is 24.685 mm, and the aspheric coefficient is 0; the fourth row and the fifth row respectively represent the data corresponding to the first optical surface E1 and the second optical surface E2 of the first lens 10, the curvature radius of the first optical surface E1 is infinite, the curvature radius of the second optical surface E2 is 888 mm, the thickness of the first lens 10 is 2 mm (that is, the distance between the first optical surface E1 and the second optical surface E2, and the thickness value in the fourth row), and the material is H-ZF52A; the sixth row and the seventh row respectively represent the data corresponding to the third optical surface E3 and the fourth optical surface E4 of the second lens 20, the curvature radius of the third optical surface E3 is −55 mm, the curvature radius of the fourth optical surface E4 is −56 mm, the thickness of the second lens 20 is 2 mm (that is, the distance between the third optical surface E3 and the fourth optical surface E4, and the thickness value in the sixth row), and the material is H-QK1; the eighth row to the sixteenth row represent the relevant parameters in the reflection and transmission of light among the membrane, the first lens 10 and the second lens 20, which may not be described again one by one here; the seventeenth row represents the glass membrane in the liquid crystal layer of the display screen, of which the thickness is 0.4 mm, and the material is BK7; the eighteenth row IMA represents the final imaging of the light.

Other corresponding parameters of the short-range optical amplification module are as shown in Table 2:

| | |
|---|---|
| Screen size C (inch) | 2.22 |
| Field angle V (°) | 90 |
| System focal length F (mm) | 29.16 |
| The effective focal length fs4 of the reflection surface of the transflective surface | 1F |

-continued

| | |
|---|---|
| F# aperture | 4 |
| Optical outer diameter (mm) | 40 |
| System distortion D | 29.2 |
| First focal length f2 of the second lens | 1F |
| Focal length f1 of the first lens | −35.4F |

By setting the relevant parameters as shown in Table 1, it is clear from Table 2 that the focal length of the first lens 10 will be −35.4F (−1032.26 mm), the first focal length f2 of the second lens 20 is F (29.16 mm), and the effective focal length of the reflection surface of the transflective surface of the second lens 20 is F (29.16 mm), and the thickness of the optical system is designed as 23.8 mm, thus it may obtain a system focal length of 29.16 mm and a field angle of 90°; by designing the aperture set in front of the short-range optical amplification module as 4, that is, designing the diameter D of the corresponding diaphragm as 7.29 mm, a large eyebox of 7 mm may be obtained accordingly.

Figure 3:
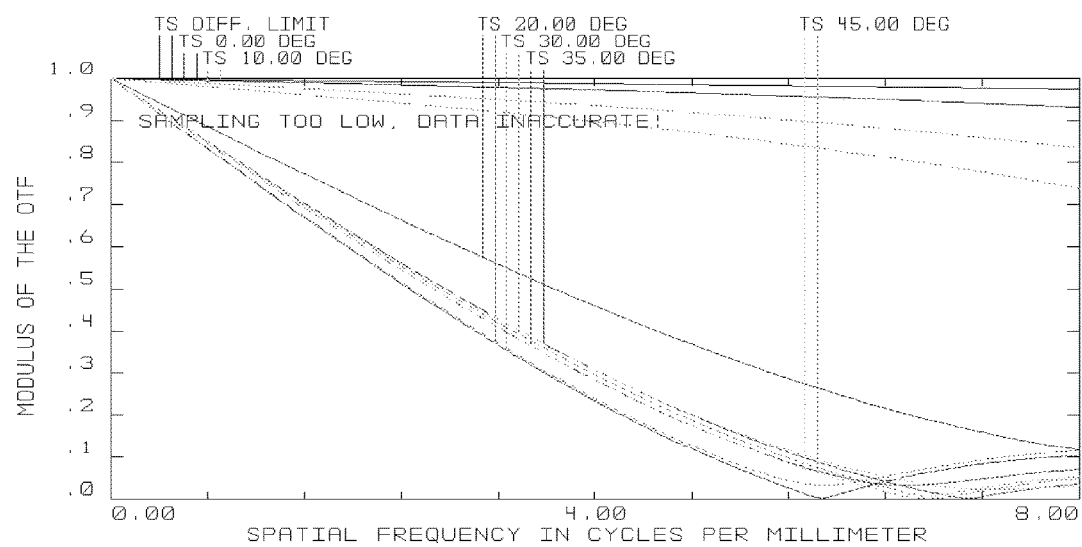
FIG. 3 is an MTF diagram of a short-range optical amplification module according to Embodiment 1.

Furthermore, the screen size is designed as 2.22 inch, and the eye relief is designed as 9 mm; in conjunction with the MTF diagram of FIG. 3, it may obtain the abscissa (spatial frequency per millimeter) value with an average ordinate (modulation transfer function) higher than 0.18 in each visual field, thereby it may be obtained that the resolving power of the short-range optical amplification module may support a resolution of 800*800.

Figure 4:
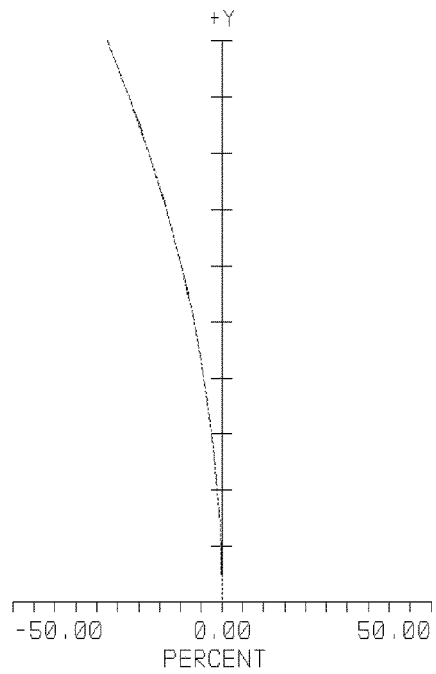
FIG. 4 is a distortion diagram of a short-range optical amplification module according to Embodiment 1.
Figure 5:
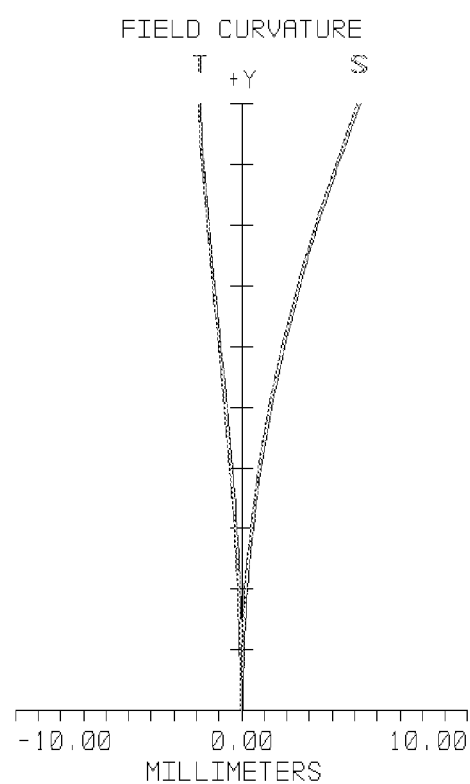
FIG. 5 is a field curvature diagram of a short-range optical amplification module according to Embodiment 1.

Moreover, it may be obtained from FIG. 4 that, in this embodiment, the optical imaging distortion factor is controlled within a range of (−29.2%, 0), and the field curvature in FIG. 5 is controlled within the range of (−10 mm, 10 mm).

Embodiment 2

Figure 6:
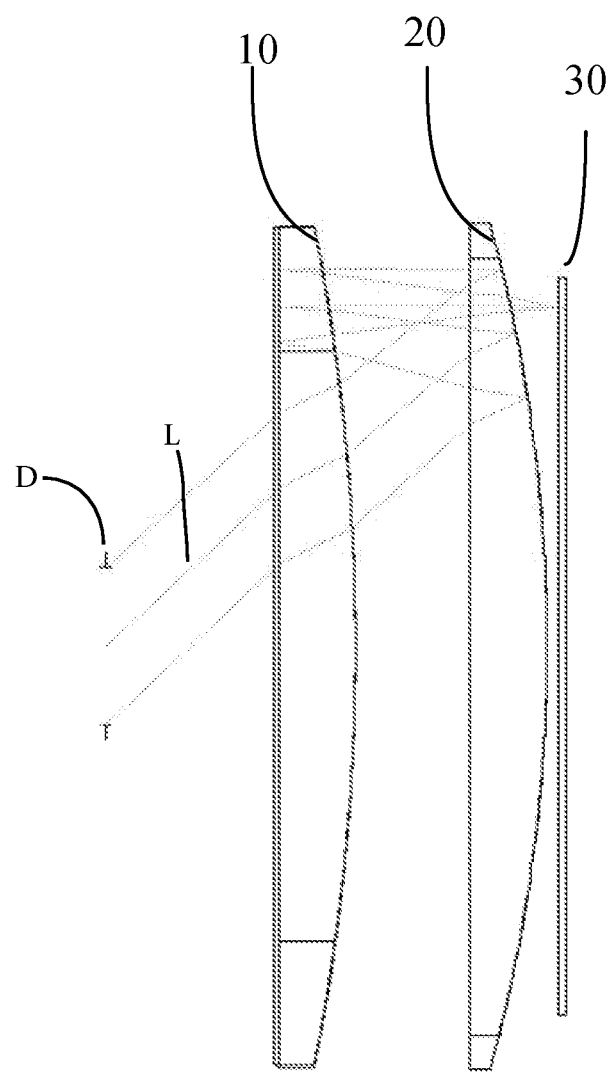
FIG. 6 is a diagram schematically showing the overall construction of a short-range optical amplification module according to Embodiment 2.

As shown in FIG. 6, in the short-range optical amplification module, the focal length of the first lens 10 is designed as 10.4F, and the first focal length f2 of the second lens 20 is designed as 1.5F (F is the system focal length), wherein:

The specific design parameters of the short-range optical amplification module are as shown in Table 3:

| Surf | Type | Radius | Thickness | Glass | Diameter | Conic |
|---|---|---|---|---|---|---|
| OBJ | STANDARD | Infinity | −200 | | 476.7014 | 0 |
| STO | STANDARD | Infinity | 9 | | 9 | 0 |
| 2 | STANDARD | Infinity | 4 | H-QK3L | 30.04656 | 0 |
| 3 | STANDARD | −134.133 | 5.996206 | | 33.5536 | 0 |
| 4 | STANDARD | Infinity | 4 | H-QK3L | 47.00138 | 0 |
| 5 | STANDARD | −99 | −4 | MIRROR | 48.08787 | 0 |
| 6 | EVENASPH | Infinity | −5.996206 | | 48.07203 | 0 |
| 7 | EVENASPH | −134.133 | −4 | H-QK3L | 47.88681 | 0 |
| 8 | STANDARD | Infinity | −0.2 | PMMA | 47.64044 | 0 |
| 9 | STANDARD | Infinity | 0 | MIRROR | 47.61382 | 0 |
| 10 | STANDARD | Infinity | 0.2 | PMMA | 47.61382 | 0 |
| 11 | STANDARD | Infinity | 4 | H-QK3L | 47.58719 | 0 |
| 12 | EVENASPH | −134.133 | 5.996206 | | 47.33418 | 0 |
| 13 | EVENASPH | Infinity | 4 | H-QK3L | 44.22057 | 0 |
| 14 | STANDARD | −99 | 0.6 | | 43.82507 | 0 |
| 15 | STANDARD | Infinity | 0.4 | BK7 | 41.91615 | 0 |
| IMA | STANDARD | Infinity | | | 41.9188 | 0 |

-continued

| | |
|---|---|
| Eyebox (mm) | 7 |
| Screen resolution | 800 * 800 |
| Optical system thickness (mm) | 23.8 |
| Eye relief (mm) | 9 |

For the explanation of other relevant parameters in this embodiment, reference may be made to Table 1 of Embodiment 1, which will not be again described one by one here.

Other corresponding parameters of the short-range optical amplification module are as shown in Table 4:

| | |
|---|---|
| Screen size C (inch) | 2.3 |
| Field angle V (°) | 100 |
| System focal length F (mm) | 26.4 |
| The effective focal length fs4 of the reflection surface of the transflective surface | 1.88F |

-continued

| | |
|---|---|
| Eyebox (mm) | 9 |
| Screen resolution | 2500 * 2500 |
| Optical system thickness (mm) | 15 |
| Eye relief (mm) | 9 |
| F# aperture | 2.9 |
| Optical outer diameter (mm) | 48 |
| System distortion D | 33.4 |
| First focal length f2 of the second lens | 1.5F |
| Focal length f1 of the first lens | 10.4F |

By the relevant parameters as shown in Table 3, it is clear from Table 4 that the focal length of the first lens 10 will be 10.4F (274.56 mm), the first focal length of the second lens 20 will be 1.5F (39.6 mm), and the effective focal length of the reflection surface of the transflective surface of the second lens 20 will be 1.88F (49.63 mm), and the thickness of the optical system will be 15 mm, thus it may obtain a system focal length of 26.4 mm and a wide field angle of 100°, by designing the aperture set in front of the short-range optical amplification module as 2.9, that is, designing the diameter D of the corresponding diaphragm as 9.1 mm, a large eyebox of 9 mm may be obtained accordingly.

Figure 7:
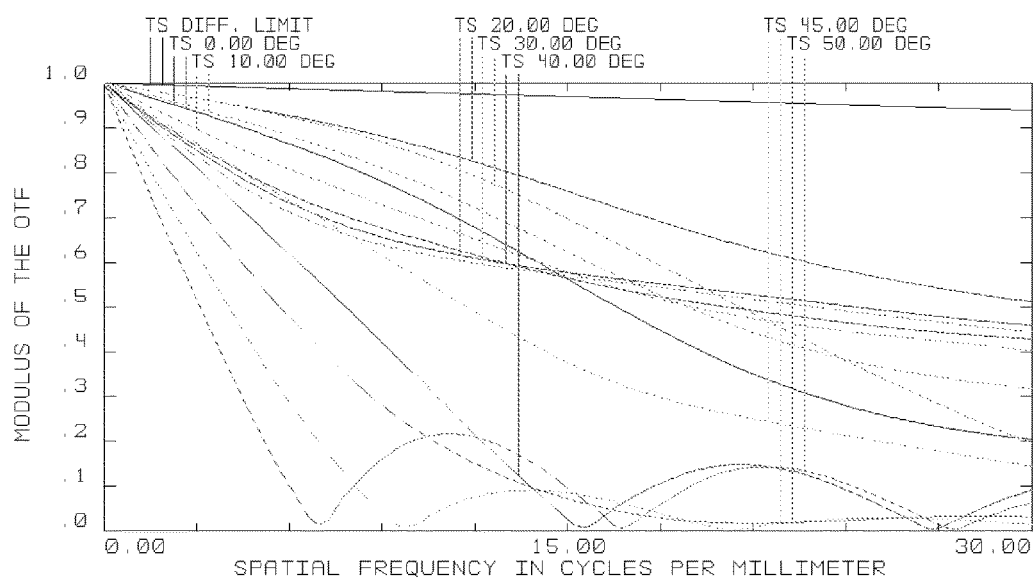
FIG. 7 is an MTF diagram a short-range optical amplification module according to Embodiment 2.
Figure 8:
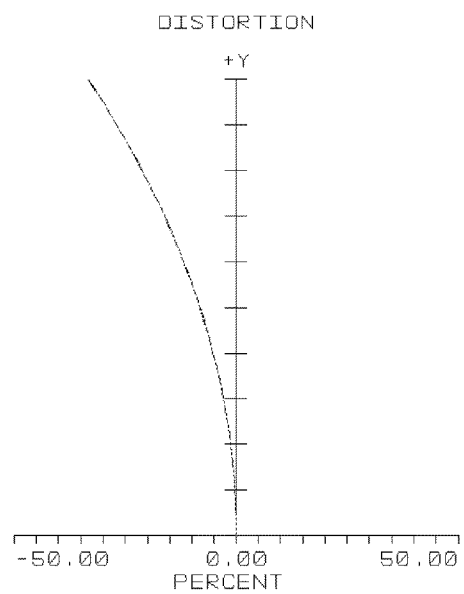
FIG. 8 is a distortion diagram of a short-range optical amplification module according to Embodiment 2.
Figure 9:
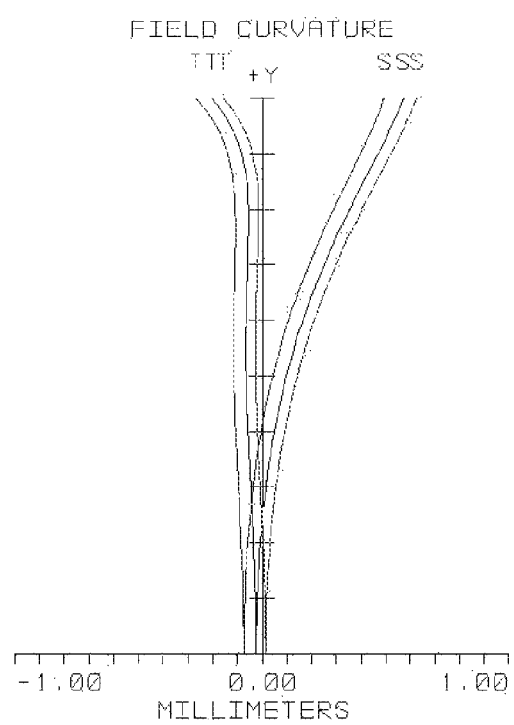
FIG. 9 is a field curvature diagram of a short-range optical amplification module according to Embodiment 2.

Furthermore, the screen size is designed as 2.3 inch, and the eye relief is designed as 9 mm; in conjunction with the MTF diagram of FIG. 7, it may obtain the abscissa (spatial frequency per millimeter) value with an average ordinate (modulation transfer function) higher than 0.18 in each visual field, thereby it may be obtained that the resolving power of the short-range optical amplification module may support a resolution of 2500*2500; moreover, the distortion factor in FIG. 8 is controlled within a range of (−33.4%, 0), and the field curvature in FIG. 9 is controlled within a range of (−1 mm, 1 mm).

Embodiment 3

Figure 10:
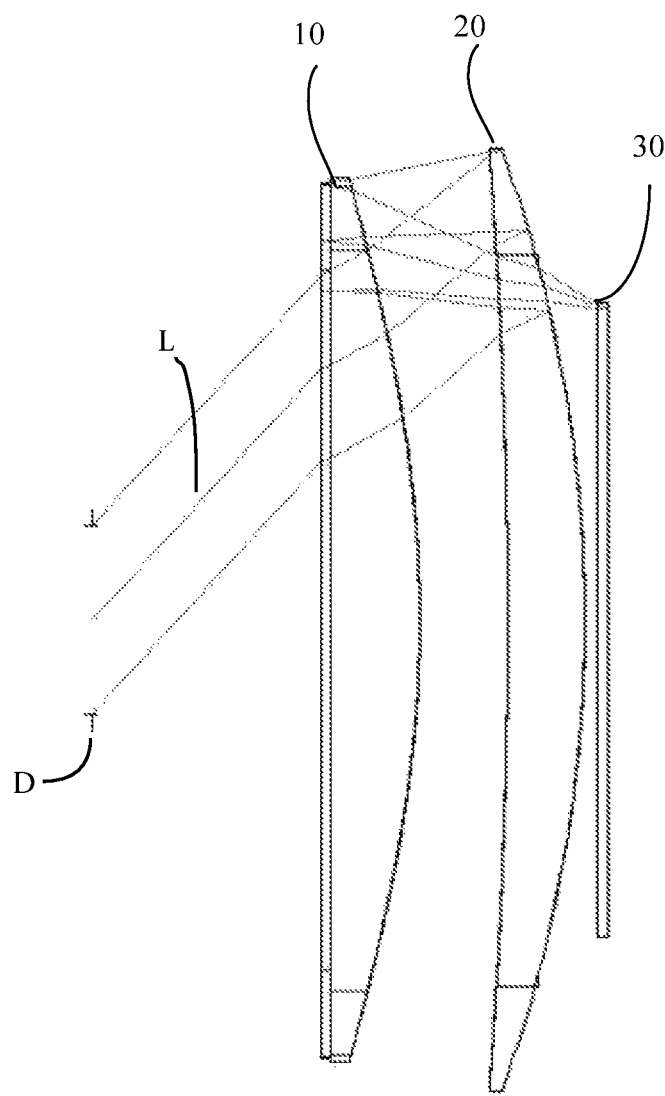
FIG. 10 is a diagram schematically showing the overall construction of a short-range optical amplification module according to Embodiment 3.

As shown in FIG. 10, in the short-range optical amplification module, the focal length of the first lens 10 is designed as 6.7F, and the first focal length f2 of the second lens 20 is designed as 1.6F (F is the system focal length), wherein:

The specific design parameters of the short-range optical amplification module are as shown in Table 5:

| Surf | Type | Radius | Thickness | Glass | Diameter | Conic |
|---|---|---|---|---|---|---|
| OBJ | STANDARD | Infinity | Infinity | | 0 | 0 |
| 1 | PARAXIAL | — | 0 | | 8 | — |
| STO | STANDARD | Infinity | 9 | | 8 | 0 |
| 3 | STANDARD | Infinity | 0.3 | BK7 | 29.41556 | 0 |
| 4 | STANDARD | Infinity | 0 | | 29.76683 | 0 |
| 5 | STANDARD | Infinity | 3.5 | PMMA | 29.76683 | 0 |
| 6 | EVENASPH | −54.86904 | 3.419999 | | 31.52462 | −29.9693 |
| 7 | EVENASPH | −276.5358 | 3 | PMMA | 39.6142 | 0 |
| 8 | STANDARD | −63.86492 | −3 | MIRROR | 40.10655 | 0 |
| 9 | EVENASPH | −276.5358 | −3.419999 | | 39.94254 | 0 |
| 10 | EVENASPH | −54.86904 | −3.5 | PMMA | 37.59622 | −29.9693 |
| 11 | STANDARD | Infinity | 0 | | 37.25802 | 0 |
| 12 | STANDARD | Infinity | −0.3 | BK7 | 37.25802 | 0 |
| 13 | STANDARD | Infinity | 0.3 | MIRROR | 37.13014 | 0 |
| 14 | STANDARD | Infinity | 0 | | 37.00227 | 0 |
| 15 | STANDARD | Infinity | 3.5 | PMMA | 37.00227 | 0 |
| 16 | EVENASPH | −54.86904 | 3.419999 | | 36.61711 | −29.9693 |
| 17 | EVENASPH | −276.5358 | 3 | PMMA | 31.11965 | 0 |
| 18 | STANDARD | −63.86492 | 0.5 | | 30.2068 | 0 |
| 19 | STANDARD | Infinity | 0.4 | BK7 | 27.05452 | 0 |
| IMA | STANDARD | Infinity | | | 26.73411 | 0 |

In Table 5, the second row represents PARAXIAL design; the fourth row represents the parameters related with the membrane consisting of a reflective polarizing plate and a first phase delay plate in the optical module; the sixth row and the seventh row represent the parameters related with the first lens 10, wherein, the second optical surface E2 of the first lens 10 is EVENASPH aspheric surface; the eighth row and the ninth row represent the parameters related with the first lens 20, wherein the third optical surface E3 of the second lens 20 is EVENASPH aspheric surface. For the explanation of other relevant parameters in this embodiment, reference may be made to Embodiment 1, which will not be again described again.

The refined design parameters of the optical surfaces in the short-range optical amplification module are as shown in Table 6:

| | |
|---|---|
| Surface OBJ: | STANDARD |
| Surface 1: | PARAXIAL |
| Focal length: | 2000 |
| OPD Mode: | 1 |
| Surface STO: | STANDARD |
| Surface 3: | STANDARD |
| Surface 4: | STANDARD |
| Surface 5: | STANDARD |
| Surface 6: | EVENASPH |
| Coeff on r 2: | 0 |
| Coeff on r 4: | −1.7328621e−005 |
| Coeff on r 6: | 6.9557989e−008 |
| Coeff on r 8: | −1.5026388e−010 |
| Coeff on r 10: | 1.445203e−013 |
| Coeff on r 12: | 0 |
| Coeff on r 14: | 0 |
| Coeff on r 16: | 0 |
| Surface 7: | STANDARD |
| Surface 8: | STANDARD |
| Surface 9: | EVENASPH |
| Coeff on r 2: | 0 |
| Coeff on r 4: | 0 |
| Coeff on r 6: | 0 |

-continued

| | |
|---|---|
| Coeff on r 8: | 0 |
| Coeff on r 10: | 0 |
| Coeff on r 12: | 0 |
| Coeff on r 14: | 0 |
| Coeff on r 16: | 0 |
| Surface 10: | EVENASPH |
| Coeff on r 2: | 0 |
| Coeff on r 4: | −1.7328621e−005 |
| Coeff on r 6: | 6.9557989e−008 |
| Coeff on r 8: | −1.5026388e−010 |
| Coeff on r 10: | 1.445203e−013 |
| Coeff on r 12: | 0 |
| Coeff on r 14: | 0 |
| Coeff on r 16: | 0 |
| Surface 11: | STANDARD |
| Surface 12: | STANDARD |
| Surface 13: | STANDARD |
| Surface 14: | STANDARD |
| Surface 15: | STANDARD |
| Surface 16: | EVENASPH |
| Coeff on r 2: | 0 |
| Coeff on r 4: | −1.7328621e−005 |
| Coeff on r 6: | 6.9557989e−008 |
| Coeff on r 8: | −1.5026388e−010 |
| Coeff on r 10: | 1.445203e−013 |
| Coeff on r 12: | 0 |
| Coeff on r 14: | 0 |
| Coeff on r 16: | 0 |
| Surface 17: | EVENASPH |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface 18: | STANDARD |
| Surface 19: | STANDARD |
| Surface IMA: | STANDARD |

In Table 6, the aspheric surface formula is generally expressed as follows:

$$x = \frac{cr^2}{1+\sqrt{1-Kc^2r^2}} + dr^4 + er^6 + fr^8 + gr^{10} + hr^{12} + ir^{14} + jr^{16} \quad (6)$$

Wherein: r is the distance from a point on the lens to the optical axis, c is curvature at the vertex of a curved surface, K is the conic constant, and d, e, f, g, h, i, j are polynomial coefficients.

By substituting the values of the corresponding coefficients into x formula (6) respectively, the aspheric surface equation of each surface will be obtained.

Other corresponding parameters of the short-range optical amplification module are as shown in Table 7:

| | |
|---|---|
| Screen size C (inch) | 1.49 |
| Field angle V (°) | 100 |
| System focal length F (mm) | 16.48 |
| The effective focal length fs4 of the reflection surface of the transflective surface | 1.9F |
| Eyebox (mm) | 8 |
| Screen resolution | 2600 * 2600 |
| Optical system thickness (mm) | 11.1 |
| Eye relief (mm) | 9 |
| F# aperture | 2.1 |
| Optical outer diameter (mm) | 40 |
| System distortion D | 32.8 |
| First focal length f2 of the second lens | 1.6F |
| Focal length f1 of the first lens | 6.7F |

By setting the relevant parameters as shown in Tables 5 and 6, it is clear from Table 7 that the focal length of the first lens 10 will be 6.7F (110.42 mm), the first focal length of the second lens 20 will be 1.6F (26.368 mm), and the effective focal length of the reflection surface of the transflective surface of the second lens 20 will be 1.9F (94.297 mm), and the thickness of the optical system will be 11.1 mm, thus it may obtain a system focal length of 16.48 mm and a wide field angle of 100°, by designing the aperture set in front of the short-range optical amplification module as 2.1, that is, designing the diameter D of the corresponding diaphragm as 8 mm, a large eyebox of 8 mm may be obtained accordingly.

Figure 11:
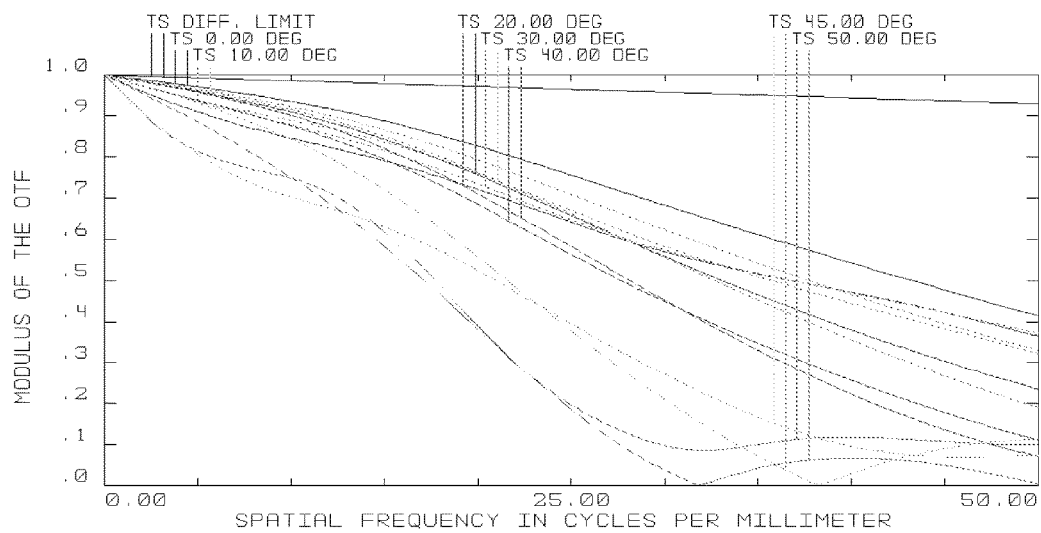
FIG. 11 is an MTF diagram of a short-range optical amplification module according to Embodiment 3.
Figure 12:
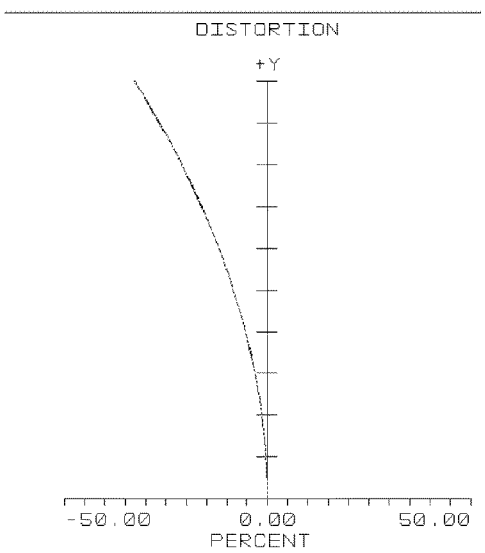
FIG. 12 is a distortion diagram of a short-range optical amplification module according to Embodiment 3.
Figure 13:
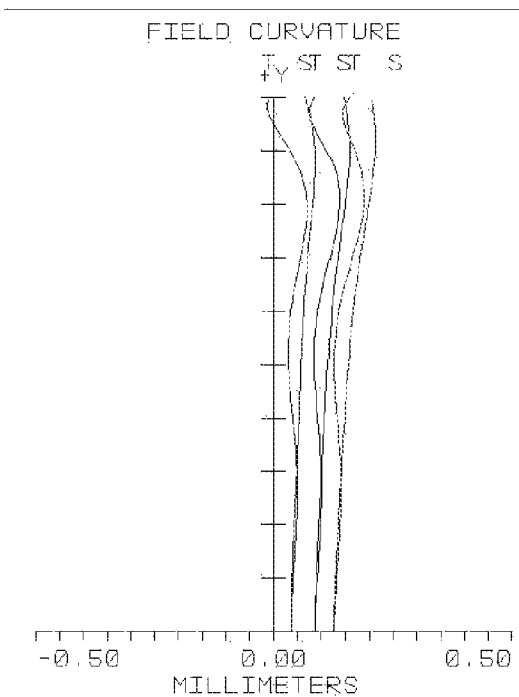
FIG. 13 is a field curvature diagram of a short-range optical amplification module according to Embodiment 3.

Furthermore, the screen size is designed as 1.49 inch, and the eye relief is designed as 9 mm; in conjunction with the MTF diagram of FIG. 11, it may obtain the abscissa (spatial frequency per millimeter) value with an average ordinate (modulation transfer function) higher than 0.18 in each visual field, thereby it may be obtained that the resolving power of the short-range optical amplification module may support a high resolution of 2600*2600; moreover, it may be seen from FIG. 12 that the optical imaging distortion factor in this embodiment may be controlled within a range of (−32.8%, 0%), and the field curvature in FIG. 13 may be controlled within a range of (−0.5 mm, 0.5 mm).

Embodiment 4

Figure 14:
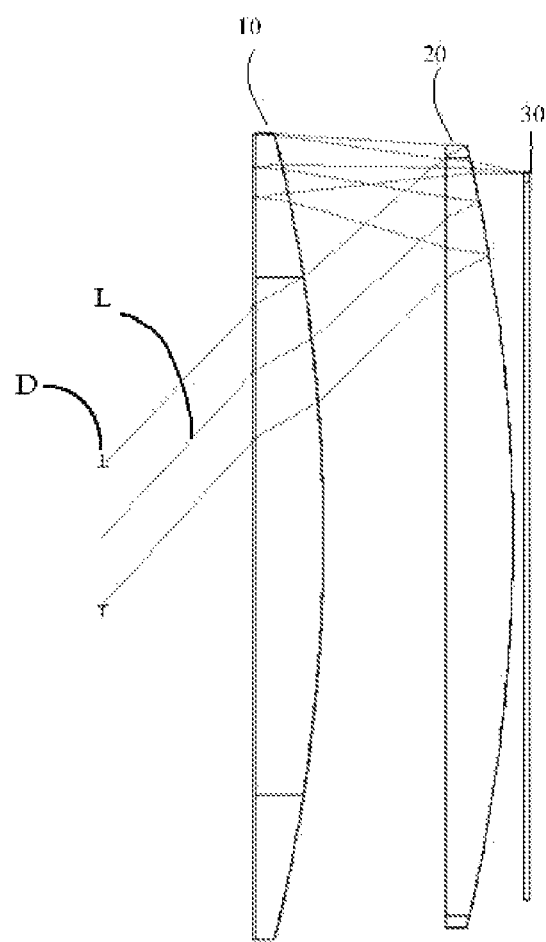
FIG. 14 is a diagram schematically showing the overall construction of a short-range optical amplification module according to Embodiment 4.

As shown in FIG. 14, in the short-range optical amplification module, the focal length of the first lens 10 is designed as 8.2F, and the first focal length f2 of the second lens 20 is designed as 1.6F (F is the system focal length), wherein:

The specific design parameters of the short-range optical amplification module are as shown in Table 8:

| Surf | Type | Radius | Thickness | Glass | Diameter | Conic |
|---|---|---|---|---|---|---|
| OBJ | STANDARD | Infinity | −200 | | 476.7014 | 0 |
| STO | STANDARD | Infinity | 9 | | 9 | 0 |
| 2 | STANDARD | Infinity | 4 | H-QK3L | 30.04656 | 0 |
| 3 | STANDARD | −118.5728 | 7.181132 | | 33.4005 | 0 |
| 4 | STANDARD | Infinity | 4 | H-QK3L | 49.01052 | 0 |
| 5 | STANDARD | −118.5728 | −4 | MIRROR | 50.35067 | 0 |
| 6 | EVENASPH | Infinity | −7.181132 | | 50.47811 | 0 |
| 7 | EVENASPH | −118.5728 | −4 | H-QK3L | 51.94988 | 0 |
| 8 | STANDARD | Infinity | −0.2 | PMMA | 51.89456 | 0 |
| 9 | STANDARD | Infinity | 0 | MIRROR | 51.88471 | 0 |
| 10 | STANDARD | Infinity | 0.2 | PMMA | 51.88471 | 0 |

-continued

| Surf | Type | Radius | Thickness | Glass | Diameter | Conic |
|------|----------|-----------|----------|--------|----------|-------|
| 11 | STANDARD | Infinity | 4 | H-QK3L | 51.87486 | 0 |
| 12 | EVENASPH | −118.5728 | 7.181132 | | 51.81882 | 0 |
| 13 | EVENASPH | Infinity | 4 | H-QK3L | 48.8141 | 0 |
| 14 | STANDARD | −118.5728 | 0.6 | | 48.51562 | 0 |
| 15 | STANDARD | Infinity | 0.4 | BK7 | 46.9492 | 0 |
| IMA | STANDARD | Infinity | | | 46.95952 | 0 |

For the explanation of the relevant parameters in Table 8 of this embodiment, reference may be made to Embodiment 1 to Embodiment 3, which will not be again described one by one here.

Other corresponding parameters of the short-range optical amplification module are as shown in Table 9:

| | |
|---|---|
| Screen size C (inch) | 2.6 |
| Field angle V (°) | 100 |
| System focal length F (mm) | 29.5 |
| The effective focal length fs4 of the reflection surface of the transflective surface | 2F |
| Eyebox (mm) | 9 |
| Screen resolution | 4000 * 4000 |
| Optical system thickness (mm) | 16.2 |
| Eye relief (mm) | 9 |
| F# aperture | 3.2 |
| Optical outer diameter (mm) | 52 |
| System distortion D | 33 |
| First focal length f2 of the second lens | 1.6F |
| Focal length f1 of the first lens | 8.2F |

By setting the relevant parameters as shown in Tables 8, it is clear from Table 9 that the focal length of the first lens 10 will be 8.5F (241.9 mm), and the first focal length of the second lens 20 will be 1.6F (47.2 mm), and the effective focal length of the reflection surface of the transflective surface of the second lens 20 will be 2F (59 mm), and the thickness of the optical system will be 16.5 mm, thus it may obtain a system focal length of 29.5 mm mm and a wide field angle of 100°; by designing the aperture set in front of the short-range optical amplification module as 3.2, that is, designing the diameter D of the corresponding diaphragm as 9.2 mm, a large eyebox of 9 mm may be obtained accordingly.

Figure 15:
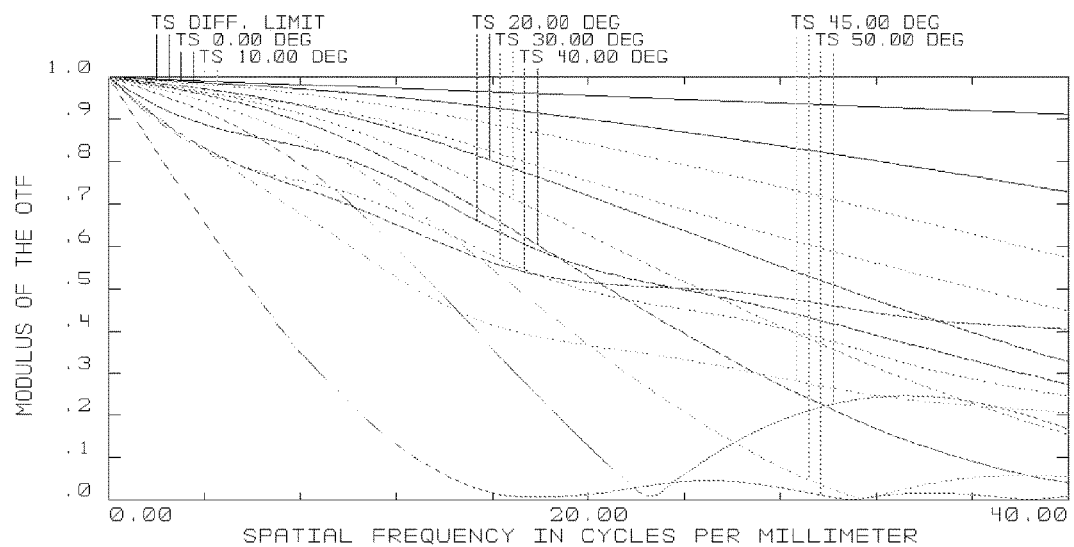
FIG. 15 is an MTF diagram of a short-range optical amplification module according to Embodiment 4.
Figure 16:
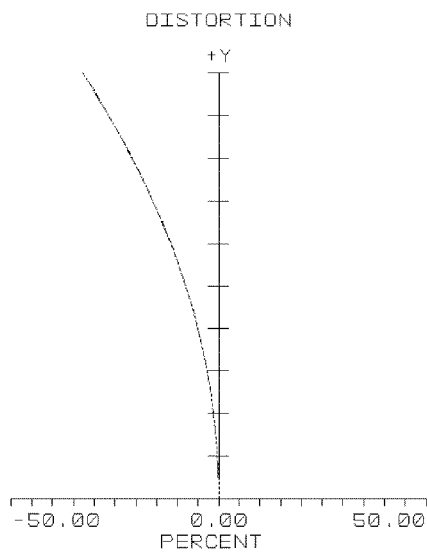
FIG. 16 is a distortion diagram of a short-range optical amplification module according to Embodiment 4.
Figure 17:
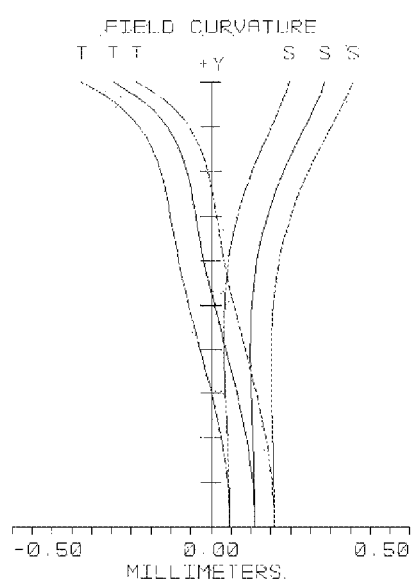
FIG. 17 is a field curvature diagram of a short-range optical amplification module according to Embodiment 4.

Furthermore, the screen size is designed as 2.6 inch, and the eye relief is designed as 9 mm; in conjunction with the MTF diagram of FIG. 15, it may obtain the abscissa (spatial frequency per millimeter) value with an average ordinate (modulation transfer function) higher than 0.18 in each visual field, thereby it may be obtained that the resolving power of the short-range optical amplification module may support a resolution of 4000*4000; moreover, it may be seen from FIG. 16 that the distortion factor may be controlled within a range of (−33%, 0), and the field curvature in FIG. 17 may be controlled within a range of (−0.5 mm, 0.5 mm).

Embodiment 5

Figure 18:
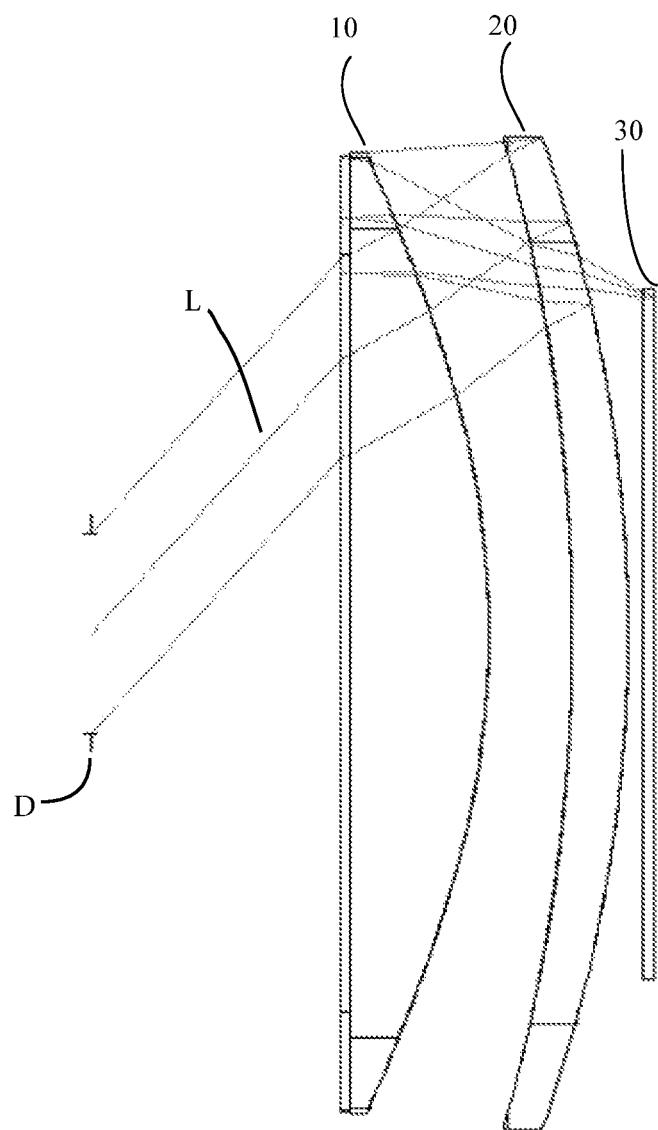
FIG. 18 is a diagram schematically showing the overall construction of a short-range optical amplification module according to Embodiment 5.

As shown in FIG. 18, in the short-range optical amplification module, the focal length of the first lens 10 is designed as 3.8F, and the first focal length f2 of the second lens 20 is designed as 2F (F is the system focal length), wherein:

The specific design parameters of the short-range optical amplification module are as shown in Table 10:

| Surf | Type | Radius | Thickness | Glass | Diameter | Conic |
|------|----------|-----------|-----------|--------|----------|-----------|
| OBJ | STANDARD | Infinity | Thickness | | 0 | 0 |
| 1 | PARAXIAL | — | 0 | | 7.8 | — |
| STO | STANDARD | Infinity | 9 | | 7.8 | 0 |
| 3 | STANDARD | Infinity | 0.3 | BK7 | 29.21646 | 0 |
| 4 | STANDARD | Infinity | 0 | | 29.56774 | 0 |
| 5 | STANDARD | Infinity | 7 | PMMA | 29.56774 | 0 |
| 6 | EVENASPH | −34.11663 | 2.631247 | | 33.25403 | −12.66719 |
| 7 | EVENASPH | −69 | 2 | BK7 | 38.47584 | 0 |
| 8 | STANDARD | −72 | −2 | MIRROR | 40.43752 | 0 |
| 9 | EVENASPH | −69 | −2.631247 | | 40.10675 | 0 |
| 10 | EVENASPH | −34.11663 | −7 | PMMA | 40.47701 | −12.66719 |
| 11 | STANDARD | Infinity | 0 | | 40.1165 | 0 |
| 12 | STANDARD | Infinity | −0.3 | BK7 | 40.1165 | 0 |
| 13 | STANDARD | Infinity | 0.3 | MIRROR | 40.04031 | 0 |
| 14 | STANDARD | Infinity | 0 | | 39.96411 | 0 |
| 15 | STANDARD | Infinity | 7 | PMMA | 39.96411 | 0 |
| 16 | EVENASPH | −34.11663 | 2.631247 | | 39.54659 | −12.66719 |
| 17 | EVENASPH | −69 | 2 | BK7 | 33.05867 | 0 |
| 18 | STANDARD | −72 | 0.5 | | 32.08565 | 0 |
| 19 | STANDARD | Infinity | 0.4 | BK7 | 29.67339 | 0 |
| IMA | STANDARD | Infinity | | | 29.41675 | 0 |

For the explanation of the relevant parameters in Table 10 of this embodiment, reference may be made to Embodiment 1 to Embodiment 3, which will not be again described one by one here.

The refined design parameters of the optical surfaces in the short-range optical amplification module are as shown in Table 11:

| | |
|---|---|
| Surface OBJ: | STANDARD |
| Surface 1: | PARAXIAL |

-continued

| | |
|---|---|
| Focal length: | 2000 |
| OPD Mode: | 1 |
| Surface STO: | STANDARD |
| Surface 3: | STANDARD |
| Surface 4: | STANDARD |
| Surface 5: | STANDARD |
| Surface 6: | EVENASPH |
| Coeff on r 2: | 0 |
| Coeff on r 4: | −3.2267582e−005 |
| Coeff on r 6: | 9.7858135e−008 |
| Coeff on r 8: | −1.6661362e−010 |
| Coeff on r 10: | 1.2640734e−013 |
| Coeff on r 12: | 0 |
| Coeff on r 14: | 0 |
| Coeff on r 16: | 0 |
| Surface 7: | STANDARD |
| Surface 8: | STANDARD |
| Surface 9: | EVENASPH |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface 10: | EVENASPH |
| Coeff on r 2: | 0 |
| Coeff on r 4: | −3.2267582e−005 |
| Coeff on r 6: | 9.7858135e−008 |
| Coeff on r 8: | −1.6661362e−010 |
| Coeff on r 10: | 1.2640734e−013 |
| Coeff on r 12: | 0 |
| Coeff on r 14: | 0 |
| Coeff on r 16: | 0 |
| Surface 11: | STANDARD |
| Surface 12: | STANDARD |
| Surface 13: | STANDARD |
| Surface 14: | STANDARD |
| Surface 15: | STANDARD |
| Surface 16: | EVENASPH |
| Coeff on r 2: | 0 |
| Coeff on r 4: | −3.2267582e−005 |
| Coeff on r 6: | 9.7858135e−008 |
| Coeff on r 8: | −1.6661362e−010 |
| Coeff on r 10: | 1.2640734e−013 |
| Coeff on r 12: | 0 |
| Coeff on r 14: | 0 |
| Coeff on r 16: | 0 |
| Surface 17: | EVENASPH |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface 18: | STANDARD |
| Surface 19: | STANDARD |
| Surface IMA: | STANDARD |

Other corresponding parameters of the short-range optical amplification module are as shown in Table 12:

| | |
|---|---|
| Screen size C (inch) | 1.66 |
| Field angle V (°) | 100 |
| System focal length F (mm) | 18 |
| The effective focal length fs4 of the reflection surface of the transflective surface | 1.9F |
| Eyebox (mm) | 8 |
| Screen resolution | 2000 * 2000 |
| Optical system thickness (mm) | 12.8 |
| Eye relief (mm) | 9 |
| F# aperture | 2.3 |
| Optical outer diameter (mm) | 40 |

-continued

| | |
|---|---|
| System distortion D | 32.5 |
| First focal length f2 of the second lens | 2F |
| Focal length f1 of the first lens | 3.8F |

By setting the relevant parameters as shown in Tables 10 and 11, it is clear from Table 12 that the focal length of the first lens 10 will be 3.8F (68.4 mm), and the first focal length of the second lens 20 will be 2F (36 mm), and the effective focal length of the reflection surface of the transflective surface of the second lens 20 will be 1.9F (34.2 mm), and the thickness of the optical system will be 12.8 mm, thus it may obtain a system focal length of 18 mm and a wide field angle of 100°; by designing the aperture set in front of the short-range optical amplification module as 2.3, that is, designing the diameter D of the corresponding diaphragm as 8 mm, a large eyebox of 8 mm may be obtained accordingly.

Figure 19:
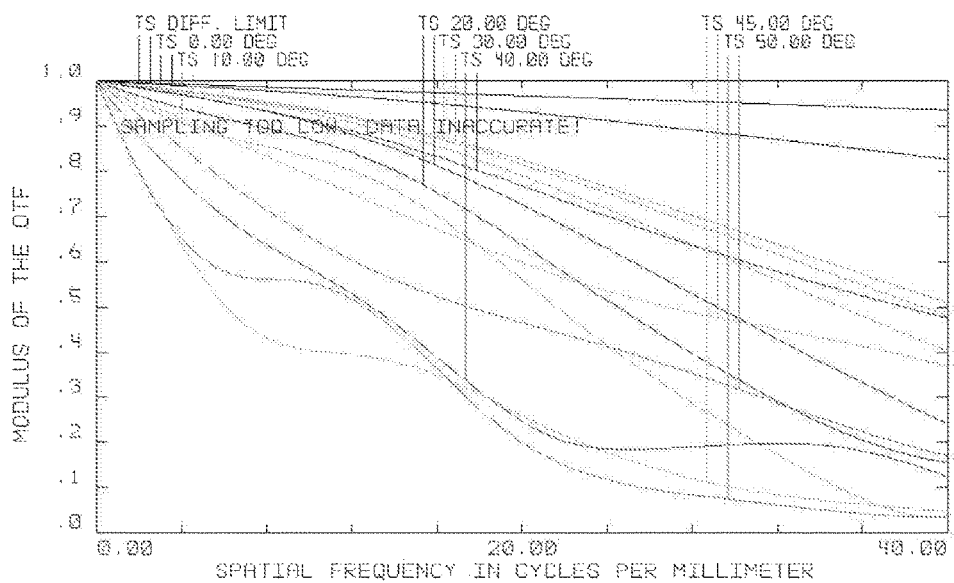
FIG. 19 is an MTF diagram of a short-range optical amplification module according to Embodiment 5.
Figure 20:
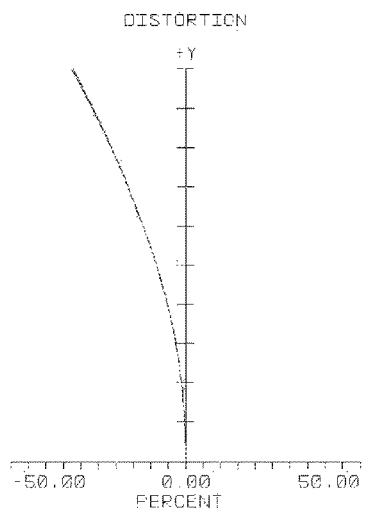
FIG. 20 is a distortion diagram of a short-range optical amplification module according to Embodiment 5.
Figure 21:
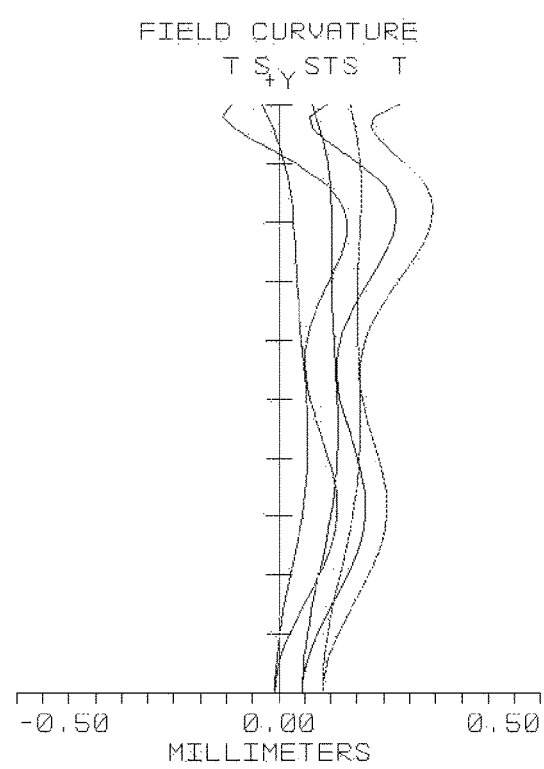
FIG. 21 is a field curvature diagram of a short-range optical amplification module according to Embodiment 5.

Furthermore, the screen size is designed as 1.66 inch, and the eye relief is designed as 9 mm; in conjunction with the MTF diagram of FIG. 19, it may obtain the abscissa (spatial frequency per millimeter) value with an average ordinate (modulation transfer function) higher than 0.18 in each visual field, thereby it may be obtained that the resolving power of the short-range optical amplification module may support a resolution of 2000*2000, and the distortion factor in FIG. 20 is controlled within a range of (−32.5%, 0), and the field curvature in FIG. 21 is controlled within a range of (−0.5 mm, 0.5 mm).

Moreover, the effective focal length of the reflection surface of the transflective surface is not limited to being designed as 1.9F, and it may also be designed as 5F; the thickness of the optical system and the eye relief are not limited to being designed respectively as 12.8 mm and 9 mm, and they may also be designed as 28 mm and 10 mm respectively.

Based on the short-range optical amplification module according to this embodiment, there is further provided a pair of spectacles which includes the short-range optical amplification module in the above embodiments. The spectacles further include a screen 30 which is set coaxially or noncoaxially with the short-range optical amplification module. The screen 30 in FIG. 2, FIG. 6, FIG. 10, FIG. 14 and FIG. 18 is set coaxially with the short-range optical amplification module; however, in use, the screen 30 may be set coaxially or noncoaxially with the short-range optical amplification module according to specific application requirements.

Based on the short-range optical amplification module according to this embodiment, there is further provided a helmet which includes the short-range optical amplification module in the above embodiments. The helmet further includes a screen 30 which is set coaxially or noncoaxially with the short-range optical amplification module. The screen 30 in FIG. 2, FIG. 6, FIG. 10 and FIG. 14 is set coaxially with the short-range optical amplification module here for the convenience of expression; however, in use, the screen 30 may be set coaxially or noncoaxially with the short-range optical amplification module according to specific application requirements.

Based on the spectacles and the helmet described herein, there is further provided a VR system which includes the spectacles or the helmet in the above embodiments and is used in an intelligent Virtual Reality (VR) wearable device. The said VR system includes a pair of spectacles or a helmet containing the short-range optical amplification module are or is employed, so that the VR system will have a wide field angle, a large eyebox, high-quality imaging effect and a compact ultrathin structure, etc., and hence it can provide a good user experience. Specifically, reference may be made to the embodiments of the short-range optical amplification module.

It should be noted that, the ordinal adjectives such as "first" and "second" employed herein are only used for distinguishing one entity or operation from another entity or operation, rather than requiring or implying that these entities or operations must have certain relations or be in a given sequence. Moreover, the terms "include", "comprise" or any variations thereof intend to encompass nonexclusive inclusion, so that a process, a method, an object or a device that are said to include a series of essential factors not only include such essential factors, but also include other essential factors that are not listed specifically or essential factors inherent in such a process, method, object or device. In the case of no other limitation, an essential factor defined by a sentence "includes a . . . " does not exclude that additional similar essential factors may exist in the process, method, object or device that includes said essential factor.

The above description only shows some specific embodiments of the present invention for one skilled in the art to be able to understand or implement the invention. Various modifications to these embodiments are apparent to those skilled in the art. The general principles defined herein may be implemented in other embodiments without departing from the spirit or scope of the present invention. Therefore, the present invention will not be limited to the embodiments described herein; instead, the invention conforms to the widest scope that is consistent with the principles and novel features disclosed herein.

What is claimed is:

1. A short-range optical amplification module, comprising: a reflective polarizing plate, a first phase delay plate, a second lens and a second phase delay plate that are arranged sequentially, wherein:
   a first lens is further set on either side of any one of the reflective polarizing plate, the first phase delay plate, the second lens and the second phase delay plate;
   in the second lens, an optical surface adjacent to the second phase delay plate is a transflective optical surface; and
   a first focal length f2 of the second lens meets the following condition: $1F \leq f2 \leq 2F$, wherein F is a system focal length of the short-range optical amplification module.

2. The short-range optical amplification module according to claim 1, wherein an effective focal length fs4 of a reflection surface of the transflective optical surface meets the following condition: $1.5F \leq fs4 \leq 5F$.

3. The short-range optical amplification module according to claim 2, wherein the effective focal length fs4 of the reflection surface of the transflective optical surface meets the following condition: $1F \leq fs4 \leq 2F$.

4. The short-range optical amplification module according to claim 1, wherein the first focal length f2 of the second lens meets the following condition: $1.5F \leq f2 \leq 2F$.

5. The short-range optical amplification module according to claim 4, wherein the first focal length f2 of the second lens is 1.6F.

6. The short-range optical amplification module according to claim 1, wherein in the second lens, a focal length fs3 of an optical surface adjacent to the first lens meets the following condition: $|fs3| \geq 2F$.

7. The short-range optical amplification module according to claim 1, wherein a focal length f1 of the first lens meets the following condition: $|f1| \geq 3F$.

8. The short-range optical amplification module according to claim 1, wherein a thickness of the short-range optical amplification module is 11 mm~28 mm.

9. The short-range optical amplification module according to claim 1, wherein an eye relief of the short-range optical amplification module is 5~10 mm.

10. The short-range optical amplification module according to claim 1, wherein an aperture D, through which light that takes part in imaging via the second lens and the first lens passes, meets the following condition: $0.28F \leq D \leq 0.45F$.

11. A short-range optical amplification spectacles, comprising: the short-range optical amplification module according to claim 1 and a display screen, wherein the display screen is set coaxially or noncoaxially with the short-range optical amplification module.

12. A short-range optical amplification Virtual Reality (VR) system, comprising: the spectacles according to claim 11.

13. A short-range optical amplification helmet, comprising: the short-range optical amplification module according to claim 1 and a display screen, wherein the display screen is set coaxially or noncoaxially with the short-range optical amplification module.

14. A short-range optical amplification Virtual Reality (VR) system, comprising: the helmet according to claim 13.

* * * * *